United States Patent
Boland

(10) Patent No.: US 10,369,969 B2
(45) Date of Patent: Aug. 6, 2019

(54) WINDSCREEN WIPER DEVICE

(71) Applicant: Xavier Boland, Arlon (BE)

(72) Inventor: Xavier Boland, Arlon (BE)

(73) Assignee: Trico Belgium SA, Aubange (BE)

(*) Notice: Subject to any disclaimer, the term of this patent is extended or adjusted under 35 U.S.C. 154(b) by 291 days.

(21) Appl. No.: 14/974,397

(22) Filed: Dec. 18, 2015

(65) Prior Publication Data
US 2016/0101762 A1 Apr. 14, 2016

Related U.S. Application Data

(63) Continuation of application No. 13/877,220, filed as application No. PCT/EP2010/064579 on Sep. 30, 2010, now abandoned.

(51) Int. Cl.
B60S 1/04 (2006.01)
B60S 1/38 (2006.01)

(52) U.S. Cl.
CPC .......... B60S 1/3808 (2013.01); B60S 1/0461 (2013.01); B60S 1/381 (2013.01); B60S 1/3877 (2013.01); B60S 2001/3898 (2013.01)

(58) Field of Classification Search
CPC ...... B60S 1/381; B60S 1/3808; B60S 1/3877; B60S 1/3848; B60S 1/3849; B60S 1/3881;
(Continued)

(56) References Cited

U.S. PATENT DOCUMENTS 7,228,588 B2* 6/2007 Kraemer .............. B60S 1/381
15/250.201
2003/0074763 A1* 4/2003 Egner-Walter ........ B60S 1/3808
15/250.201
(Continued)

FOREIGN PATENT DOCUMENTS

DE 10111757 * 9/2002
DE 10334609 * 6/2004
(Continued)

OTHER PUBLICATIONS

Machine translation of description portion of German publication 10334609 to Block et al, published Jun. 2004.*
(Continued)

Primary Examiner — Gary K. Graham
(74) Attorney, Agent, or Firm — Miller Canfield

(57) ABSTRACT

A windscreen wiper device comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein said oscillating arm is pivotally connected to said connecting device about a pivot axis near one end thereof, with the interposition of a joint part, wherein said wiper blade comprises a spoiler at a side thereof facing away from the windscreen to be wiped, characterized in that a free end of said spoiler, facing towards an A-pillar of the windscreen to be wiped, is provided with a beveled surface, seen from the windscreen to be wiped.

8 Claims, 4 Drawing Sheets

(58) Field of Classification Search
CPC .......... B60S 1/3863; B60S 2001/3898; B60S 2001/3827; B60S 1/0402; B60S 1/0461; B60S 1/0458; B60S 1/0452; B60S 1/0469
USPC ..................................................... 15/250.16
See application file for complete search history.

(56) References Cited

U.S. PATENT DOCUMENTS

| | | | |
|---|---|---|---|
| 2003/0145412 A1* | 8/2003 | Weiler ................ | B60S 1/3808 15/250.201 |
| 2007/0017056 A1* | 1/2007 | Cooke ................ | B60S 1/3808 15/250.201 |
| 2008/0150193 A1* | 6/2008 | Walworth ............. | B29C 33/76 264/310 |
| 2009/0158545 A1* | 6/2009 | Grasso ................ | B60S 1/38 15/250.001 |

FOREIGN PATENT DOCUMENTS

| | | | |
|---|---|---|---|
| DE | 10341278 | * | 6/2004 |
| JP | 2007210518 A | | 8/2007 |

OTHER PUBLICATIONS

Machine translation of description portion of German publication 10341278 to Heinrich, published Jun. 2004.*

* cited by examiner

– – 1 –

WINDSCREEN WIPER DEVICE

CROSS REFERENCE TO RELATED APPLICATIONS

This Continuation patent application claims the benefit of and priority to U.S. National Stage patent application Ser. No. 13/877,220 filed Jun. 11, 2013, which claims the benefit of PCT International Serial No. PCT/EP2010/064579 filed Sep. 30, 2010, the entire disclosures of the applications being considered part of the disclosure of this application, and hereby incorporated by reference.

BACKGROUND OF THE INVENTION

1. Technical Field

The present invention relates to a windscreen wiper device comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein the oscillating arm is pivotally connected to the connecting device about a pivot axis near one end thereof, with the interposition of a joint part, wherein the wiper blade comprises a spoiler at a side thereof facing away from the windscreen to be wiped.

2. Related Art

Such a windscreen wiper device is known from European patent publication no. 1 491 416 of the same Applicant. The prior art windscreen wiper device is in particular designed as a "yokeless" wiper device or "flat blade", wherein use is no longer made of several yokes pivotally connected to each other, but wherein the wiper blade is biased by two longitudinal strips of the carrier element, as a result of which it exhibits a specific curvature. According to the prior art a connecting piece (in practice also called an "end cap") is slid over neighboring ends of the strips, or vice versa, that is the neighboring ends of the strips are slid into the connecting piece—so that a snap connection between these parts is realized. In the prior art, the connecting piece is provided with an opening at its free end so that the wiper blade can freely slide through the connecting piece. In other words, the connecting pieces do not retain the wiper blade, so that the connecting pieces allow a relative movement of the wiper blade along the longitudinal strips in the connecting pieces.

One drawback of the prior art windscreen wiper device is the fact that, during oscillatory movements of the wiper blade, the connecting pieces may touch the respective A-pillars of the vehicle concerned, resulting in a rattling noise, air turbulence and sometimes in damages to the connecting pieces and/or longitudinal strips. As a result, the wiping properties may deteriorate, whereas the wiper blade may come loose from the connecting pieces, particularly when the wiper blade and the connecting pieces are not connected in a durable, solid manner. Hence, the life span of the prior art windscreen wiper device may be seriously shortened.

SUMMARY OF THE INVENTION

The object of the invention is to improve the prior art as indicated above, in particular to provide a windscreen wiper device, wherein the wiping properties are improved.

In order to accomplish that objective, a windscreen wiper device of the kind referred to in the introduction according to the invention is characterized in that a free end of the spoiler, facing towards an A-pillar of the windscreen to be wiped, is provided with a beveled surface, wherein the height of the spoiler decreases along the beveled surface, seen from the windscreen to be wiped. Preferably, the ratio between the height of the wiper blade at a location of the lowest height of the spoiler and the height of the wiper blade at a location of the highest height of the spoiler varies between 1.5 and 8, particularly between 6 and 2.

In case of left hand drive vehicles and right hand drive vehicles the spoiler is provided at both free ends with the beveled surface, so that any reverse mounting is by definition avoided.

It is noted that the present invention is not restricted to windscreen wiper devices for cars, but that it also relates to windscreen wiper devices for rail coaches and all other (fast) vehicles.

In a preferred embodiment of a windscreen wiper device in accordance with the invention the free end of the spoiler is cut to obtain the beveled surface.

In a further preferred embodiment of a windscreen wiper device according to the invention the free end of the spoiler does not comprise a connecting piece.

DESCRIPTION OF THE DRAWINGS

The invention will now be explained in more detail with reference to figures illustrated in a drawing, wherein.

DETAILED DESCRIPTION

Figure 1:
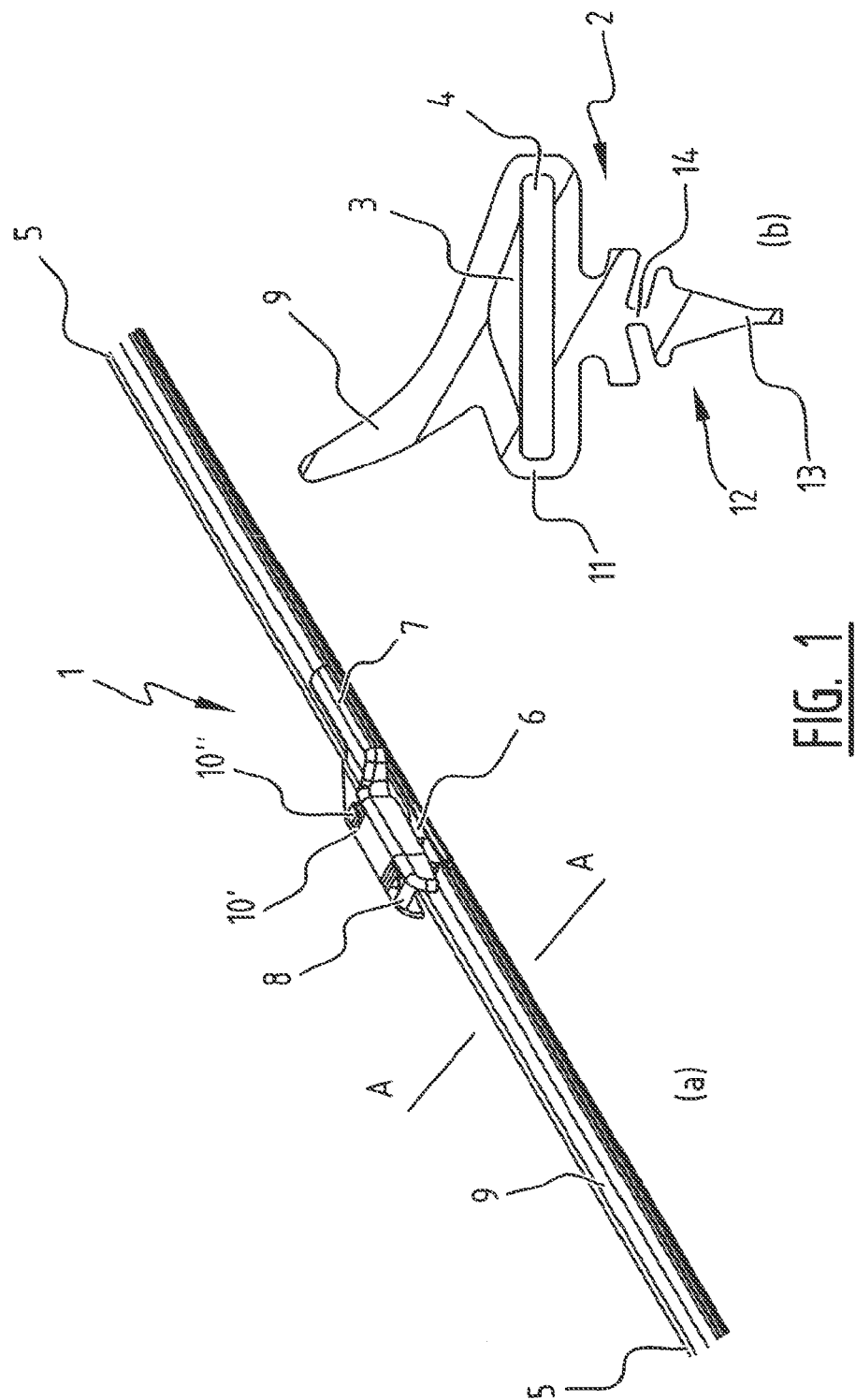
FIG. 1 is a total perspective, schematic view of a windscreen wiper device according to the invention (a), as well as a cross-sectional view thereof (b) along the line A-A.

FIG. 1 shows a preferred variant of a windscreen wiper device 1 according to the invention. The windscreen wiper device is built up of an elastomeric wiper blade 2, wherein a central longitudinal groove 3 is formed, and of a central longitudinal strip 4 made of spring band steel, which is fitted in the longitudinal groove 3. The strip 4 forms a flexible carrier element for the rubber wiper blade 2, as it were, which is thus biased in a curved position (the curvature in operative position being that of a windscreen to be wiped). Free ends 5 of the strip 4 and/or wiper blade 2 remain free, that is there are no connecting pieces or end caps connected thereto on either side of the windscreen wiper device 1. The windscreen wiper device 1 is furthermore built of a connecting device 6 of plastic material for connecting an oscillating wiper arm thereto, with the interposition of a joint part 8. Connecting device 6 comprises clamping members that are integral therewith, which engage round longitudinal sides of the wiper blade 2 that face away from each other, as a result of which the connecting device 6 is firmly attached to the unit consisting of wiper blade 2 and strip 4. The oscillating wiper arm 7 is pivotally connected to the connecting device 6 about a pivot axis near one end. The preferred embodiment of FIG. 1 according to the invention comprises a spoiler or "air deflector" 9 which is made in one piece with the rubber wiper blade 2 and which extends along the entire length thereof.

As can be seen in FIG. 1, the joint part 8 comprises a resilient tongue 10' extending outwardly, while the oscillating arm 7 has an U-shaped cross-section at the location of its connection to the joint part 8, so that the tongue 10' engages in an identically shaped hole 10" provided in a base of the U-shaped cross-section. The connecting device 6 with the wiper blade 2 is mounted onto the oscillating arm 7 as follows. The joint part 8 being already clipped onto the connecting device 6 is pivoted relative to the connecting device 6, so that the joint part 8 can be easily slid on a free end of the oscillating arm 7. During this sliding movement the resilient tongue 10' is initially pushed in against a spring force and then allowed to spring back into the hole 10", thus snapping, that is clipping the resilient tongue 10' into the hole 10". This is a so-called bayonet-connection. The oscillating arm 7 together with the joint part 8 may then be pivoted back in a position parallel to the wiper blade 2 in order to be ready for use. By subsequently pushing in again the resilient tongue 10' against the spring force (as if it were a push button), the connecting device 6 and the joint part 8 together with the wiper blade 2 may be released from the oscillating arm 7. Dismounting the connecting device 6 with the wiper blade 2 from the oscillating arm 7 is thus realized by sliding the connecting device 6 and the joint part 8 together with the wiper blade 2 in a direction away from the oscillating arm 7. As can be seen from FIG. 1, the rubber wiper blade 2 consists of an elongated upper holding part 11 holding the longitudinal strip 4 in the groove 3 formed therein, an elongated lower wiping part 12 having a wiping lip 13, as well as an intermediate "strip-like" tilting web 14 interconnecting the holding part 11 and the wiping part 12. The holding part 11, the wiping part 12 and the tilting web 14 are in one piece of rubber.

Figure 2:
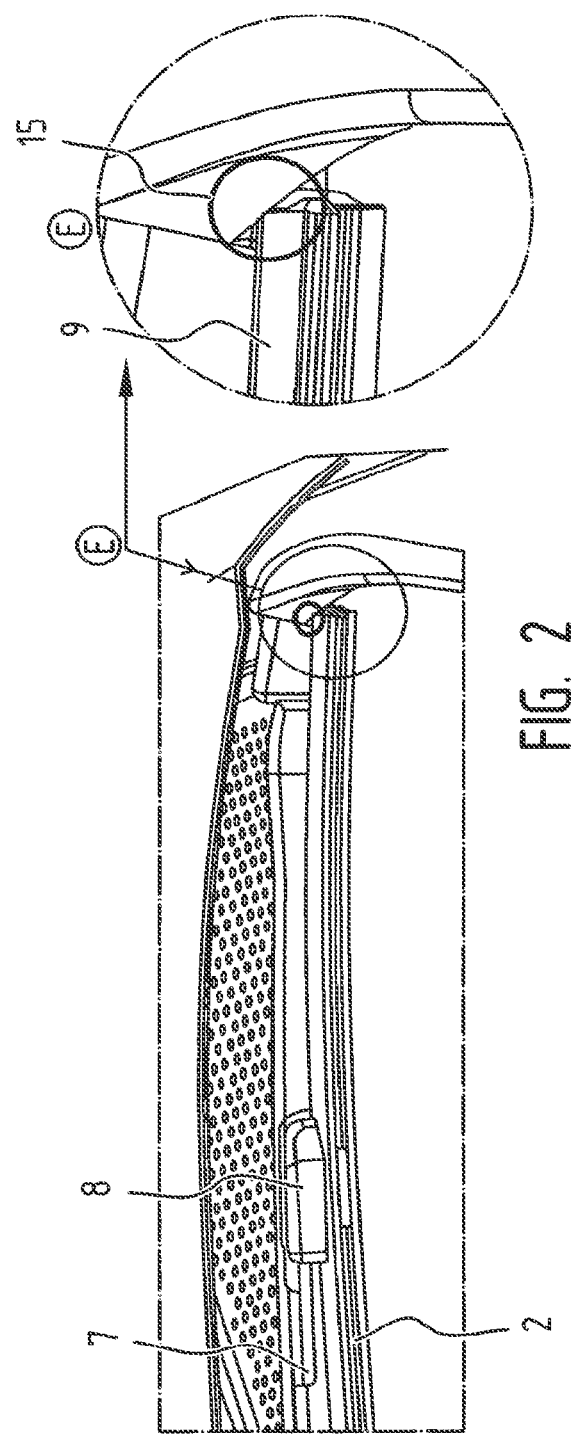
FIG. 2 is a perspective view of a standard windscreen wiper device according to the prior art, mounted on a vehicle.
Figure 3:
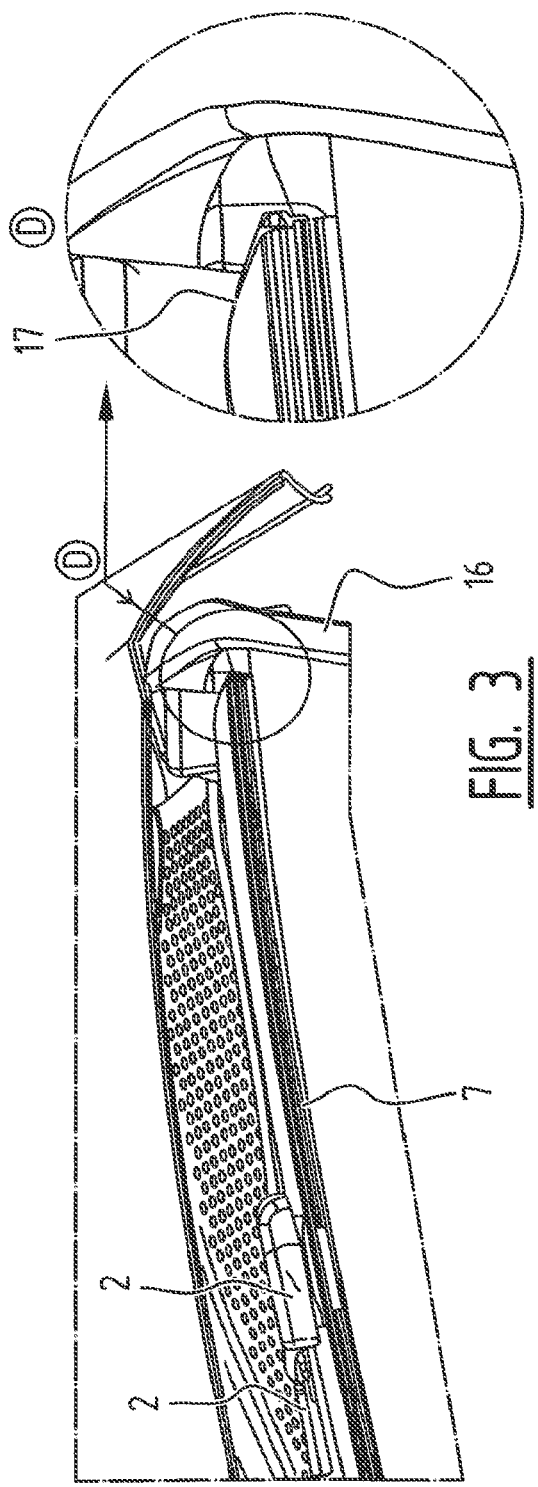
FIG. 3 is a perspective view of a windscreen wiper device according to the invention, mounted on a vehicle.

As can be seen in FIG. 2, a normal, that is standard wiper blade 2 comprises the spoiler 9 at a side thereof facing away from the windscreen to be wiped, wherein a free end 15 of the spoiler 9, facing towards an A-pillar 16 of the windscreen to be wiped, would interfere with the A-pillar 16, with all negative consequences involved. However, as shown in FIG. 3, the free end 15 of the spoiler 9 according to the invention is provided with a beveled surface 17. As shown, the height of the spoiler 15 decreased along the beveled surface 17, seen from the windscreen to be wiped.

Figure 4:
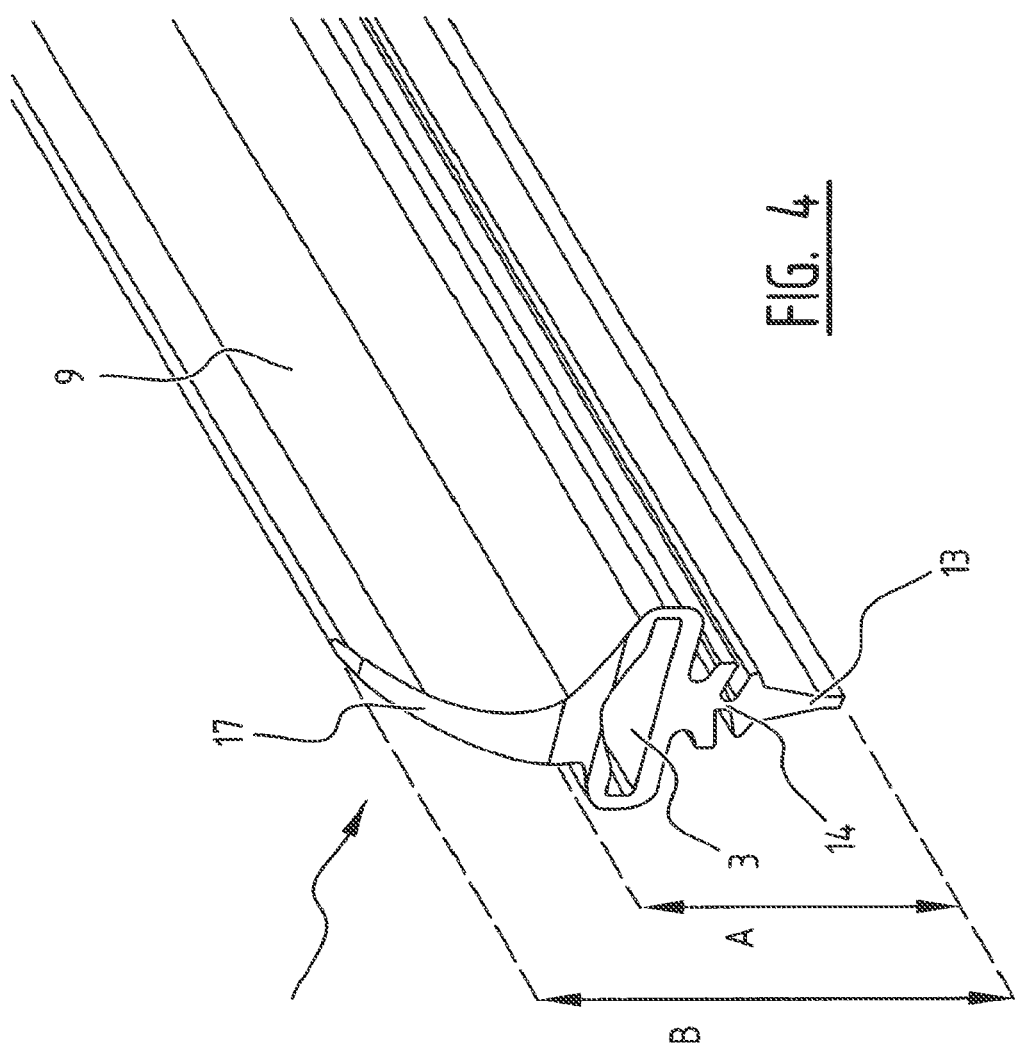
FIG. 4 is a perspective view and a side view of parts of a wiper blade equipped with a spoiler, as used in the windscreen wiper device of FIG. 1.

As can be seen from FIG. 4, the ratio between the height (A) of the wiper blade (2) at a location of the lowest height of the spoiler (9) and the height (B) of the wiper blade (2) at a location of the highest height of the spoiler (9) varies between 1.5 and 8.

Although not shown in FIGS. 1 and 2, but fully understood by a skilled person, the oscillating arm 7 is connected to a mounting head fixed for rotation to a shaft driven by a small motor. In use, the shaft rotates alternately in a clockwise and in a counter-clockwise sense carrying the mounting head into rotation also, which in turn draws the oscillating arm 7 into rotation and by means of the connecting device 6 moves the wiper blade 2.

The invention is not restricted to the embodiments shown, but also extends to other preferred embodiments falling within the scope of the appended claims.

The invention claimed is:

1. A method of installing a windscreen wiper device on a windshield of a vehicle that has an A-pillar, comprising the steps of:
   making a wiper blade made of an integral piece of elastomeric material and extending with an at least substantially constant cross-sectional shape between opposite longitudinal ends, the wiper blade including a lower wiping portion for sealing against a windscreen, the wiper blade further including an upper holding portion interconnected with the wiping part by an integral tilting web portion, and the holding portion including a longitudinal groove and a spoiler which faces away from the wiping portion;
   inserting a longitudinal strip of a carrier element into the longitudinal groove of the wiper blade;
   firmly attaching a connecting device to the wiper blade and strip;
   cutting the spoiler of the wiper blade adjacent at least one of the longitudinal ends to provide the spoiler with a bevelled portion that has a bevelled surface and wherein a height of the wiper blade along the bevelled surface decreases towards the adjacent longitudinal end for avoiding contact between the spoiler and an A-pillar on a vehicle and wherein, after cutting, the longitudinal groove of the wiper blade remains open at the at least one of the longitudinal ends of the wiper blade;
   attaching the connecting device with an oscillating arm; and
   contacting the wiping part of the wiper blade with the windshield such that the bevelled portion of the spoiler at least partially rests underneath the A-pillar of the vehicle.

2. The method as set forth in claim 1 wherein the step of cutting the spoiler is further defined as cutting the spoiler of the wiper blade adjacent each of the longitudinal ends.

3. The method as set forth in claim 1 wherein the elastomeric material is rubber.

4. The method as set forth in claim 1 wherein the step of attaching the connecting device to the wiper blade and strip includes mounting the connecting device around the spoiler without damaging the spoiler by engaging clamping members on the connecting device around longitudinal sides of the wiper blade that face away from each other.

5. The method as set forth in claim 1 wherein the groove is generally rectangular in shape and with a raised area for reduced friction between the wiper blade and the longitudinal strip.

6. The method as set forth in claim 1 wherein a ratio of the height of the wiper blade outside of the bevelled portion and the height of the wiper blade in the bevelled portion is between 1.5 and 8.

7. The method as set forth in claim 1 wherein, in a final form, the longitudinal ends of the wiper blade further are free of end caps.

8. The method as set forth in claim 1 wherein the step of making the wiper blade is further defined as extruding the wiper blade.

* * * * *